Jan. 2, 1968
R. C. MONTROSS ETAL   3,361,921
SOLID STATE CONTROL CIRCUIT FOR ELECTRIC VEHICLE
Original Filed April 21, 1965
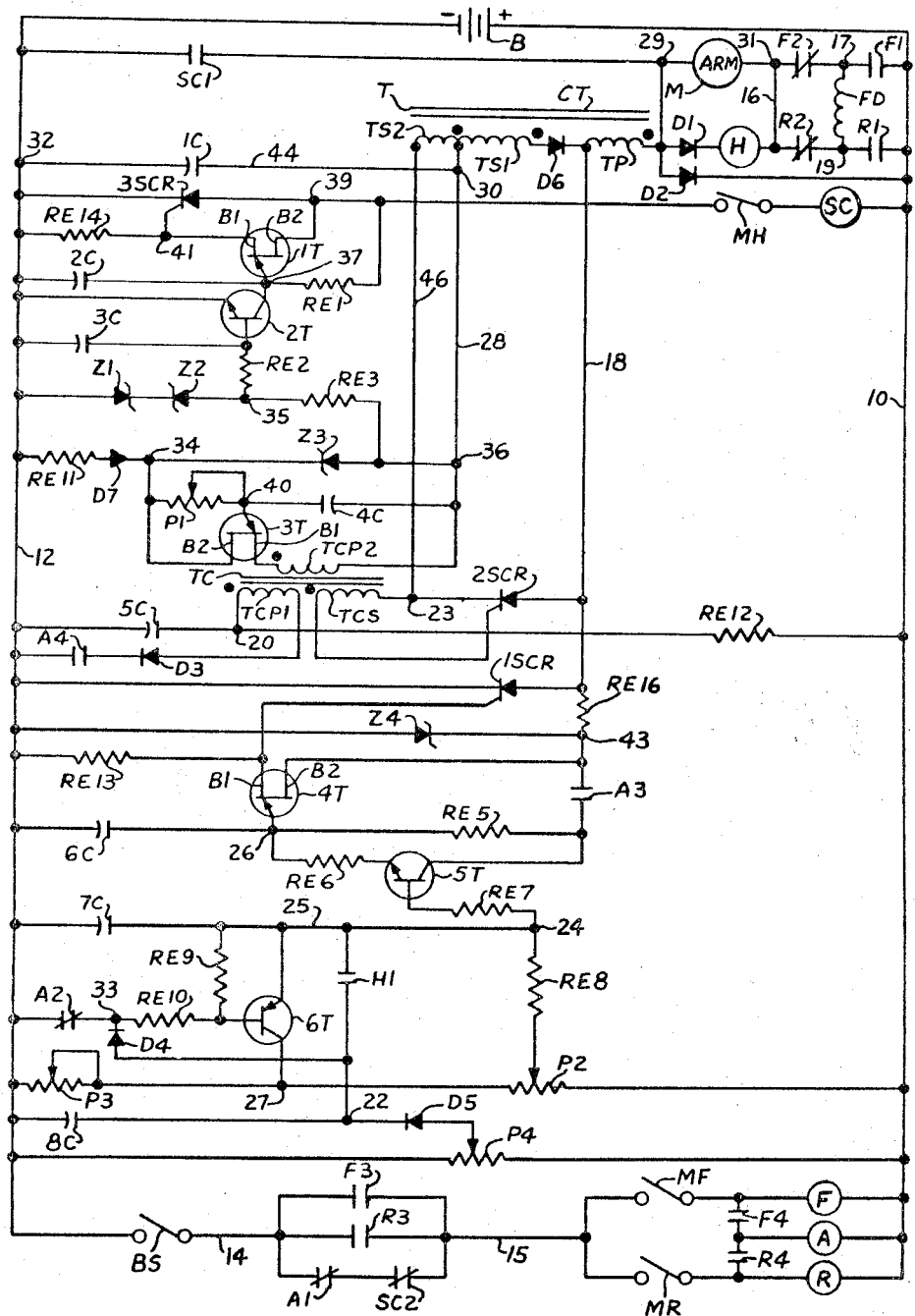
INVENTOR.
ROBERT C. MONTROSS
JOHN P. COOPER
BY United States Patent Office 3,361,921
Patented Jan. 2, 1968

3,361,921
SOLID STATE CONTROL CIRCUIT FOR
ELECTRIC VEHICLE
Robert C. Montross, Mequon, and John P. Cooper, Milwaukee, Wis., assignors to Square D Company, Park Ridge, Ill., a corporation of Michigan
Continuation of application Ser. No. 449,698, Apr. 21, 1965. This application May 23, 1967, Ser. No. 640,753
9 Claims. (Cl. 318—139)

ABSTRACT OF THE DISCLOSURE

A solid state control circuit using silicon controlled rectifiers to control current flow to a direct current motor from a battery in an eletcric vehicle wherein: a commutating capacitor is provided with a charge before the main rectifier which controls the current flow to the motor is switched to a conductive state to assure switching of the main rectifier to a nonconductive state, a cross-over circuit which is responsive to the polarity changes across the capacitor to control the operation of a shorting contactor which connects the motor directly across the vehicle batteries when the frequency of conductive pulses of power to the motor reach a selected value and a circuit for controlling the current flow to the motor during plugging.

This application is continuation of Ser. No. 449,698 filed Apr. 21, 1965.

The present invention relates to a circuit for controlling the energization of a direct current load from a direct current source, and more particularly, to a circuit for controlling the acceleration and speed of a reversible direct current motor as may be used as a prime mover for a vehicle, such as an industrial electric truck.

Heretofore, typical industrial-type, battery powered electric trucks, which were driven by series motors, included electro-magnetic switches and resistors for achieving reduced voltage starting and speed control of the motors. While these systems have proved satisfactory, they inherently were wasteful of electric energy and from a practical standpoint were limited in the number of different motor operating speeds which could be obtained. To overcome the latter deficiency, motor control systems for electric trucks have been provided with carbon pile resistors, which achieve a stepless acceleration and an infinite motor speed control. While this method does possess some advantages in that it afforded a simple, straight-forward solution to the problem, it is objectionable because of the battery energy which was uselessly consumed in the carbon pile, particularly when the truck was required to operate at an intermediate speed during a large percentage of its duty cycle.

It is an object of the present invention to provide a circuit for controlling the current flow to the field and the armature windings of a reversible direct current motor from a direct current source with a silicon controlled rectifier and thereby overcome the objectionable characteristics of systems using electromagnetic switches and carbon pile resistors while retaining the advantages of either system. In the circuit according to the present invention, the rectifier is switched to a conductive state during constant time intervals and to a nonconductive state during variable time intervals to supply the field and the armature windings with current pulses of equal magnitude and variable frequency for varying the acceleration, the deceleration and speed of rotation of the armature. The switching of the rectifier to a nonconductive state is controlled by a commutating circuit which includes a second silicon controlled rectifier, a commutating capacitor and a transformer. The commutating circuit is arranged so the capacitor is charged in one direction to have a reset charge impressed thereon when the second rectifier is momentarily switched to a conductive state. The reset charge, after being impressed on the capacitor, automatically causes the second rectifier to switch to a nonconductive state. The circuit is further arranged to charge the capacitor in a direction opposite the said one direction and impress a commutating charge on the capacitor when the first mentioned rectifier is conducting. The commutating charge, which is formed by current flow from the battery through the transformer and has a potential greater than the potential of the battery, causes the first rectifier to switch to a nonconductive state when the second rectifier is again momentarily switched to reform the reset charge on the capacitor. The transformer has its windings arranged to charge the capacitor with the commutating charge and saturate the magnetic iron core of the transformer with flux having one direction when the first mentioned rectifier is in a conductive state and to desaturate the core when the second rectifier is switched to a conductive state following the accumulation of the commutating charge on the capacitor. The circuit is sequenced so the second controlled rectifier is always switched to a conductive state before the first mentioned rectifier is switched to a conductive state in order to impress the reset charge on the capacitor before the first mentioned rectifier is switched to a conductive state to supply current to the motor field and armature windings. This arrangement assures that the circuits will be conditioned to switch the first rectifier to a nonconductive state and thereby provide a positive control of the motor operation.

A further object is to provide a circuit for controlling the current flow to the field and the armature windings of a reversible direct current motor from a direct current source with a first silicon controlled rectifier which is switched to a conductive state during constant time intervals and to a nonconductive state during variable time intervals to supply the armature and the field windings with current pulses of equal magnitude and variable frequency for controlling the acceleration, deceleration and speed of rotation of the armature and to provide the circuit with a means which will cause the frequency of the pulses to increase from a predetermined minimum when the armature and field windings are initially energized and to cause the frequency of the pulses to be less than the minimum when the armature is rotating in one direction and the field and armature windings are energized by the current pulses to reverse the direction of rotation of the armature.

Another object is to provide a circuit for controlling the current flow to the field winding and armature winding of a reversible direct current motor from a direct current source with a silicon controlled rectifier which is switched to a conductive state for constant time intervals and to a nonconductive state for variable time intervals so the motor armature and field windings are supplied with pulses of constant magnitude current of variable frequency for controlling the acceleration, deceleration and speed of rotation of the motor armature and to control the switching of the rectifier to a nonconductive state by a capacitor which receives a reset charge when the rectifier is nonconducting and a commutating charge when the rectifier is conducting, said reset and commutating charges being of opposite polarity, and to provide a means responsive to the polarity and duration of the reset and commutating charges for energizing a contactor having a pair of contacts connected in series with the circuit including the source and the motor armature and field windings and in parallel with the rectifier when the frequency of the pulses reaches a predetermined value for minimizing losses in the circuit when the armature is rotating at maximum speed.

Further objects and features of the invention will be readily apparent to those skilled in the art from the specification and appended drawing illustrating certain preferred embodiments in which:

The single figure shows a wiring diagram of a direct current motor control circuit incorporating the features of the present invention.

In the drawing, a battery B has a positive terminal connected to supply a lead 10 and a negative terminal connected to supply a lead 12. The battery B acts as a source of direct current for a motor M which has an armature winding ARM and a field winding FD.

The circuit shown in the drawing includes a forward directional contactor having an energizing coil F, a reverse directional contactor having an energizing coil R and a contactor known as the shorting contactor, having an energizing coil SC. Additionally, an accelerating relay having an energizing coil A and a holding relay having an energizing coil H are provided. The forward contactor has normally open contacts F1, F3 and F4 and normally closed contacts F2. When the coil F is energized, the normally open contacts F1, F3 and F4 are closed and the normally closed contacts F2 are open. The reverse contactor has normally open contacts R1, R3 and R4 and normally closed contacts R2. When the coil R is energized, the normally open contacts R1, R3 and R4 close and the normally closed contacts R2 open. The shorting contactor has normally open contacts SC1 and normally closed contacts SC2. When the coil SC is energized, the normally open contacts SC1 close and the normally closed contacts SC2 open. The accelerating relay has normally open contacts A3 and A4 and normally closed contacts A1 and A2. When the coil A is energized, the normally open contacts A3 and A4 close and the normally closed contacts A1 and A2 open. The holding relay has normally open contacts H1 which are closed when the coil H is energized. The mechanical connection between the contacts of the contactors and their associated coils F, R, and SC, as well as the contacts associated with the relay coil A and the relay coil H are not specifically shown with the view of simplifying the drawings and aiding to the understanding of the circuit.

The lead 12 is connected through the contacts of a switch BS to a lead 14 which in turn is connected through a three branch parallel circuit to a lead 15. The three branch parallel circuit has the normally open contacts F3 in one branch, the normally open contacts R3 in a second branch and the normally closed contacts A1 and SC2 connected in series in the third branch. The lead 15 is connected through the contacts of a switch MF and the coil F to the lead 10. Similarly, the lead 15 is connected through the contacts of a switch MR and the coil R to the lead 10. The coil A has one side connected to the lead 10 and a second side connected through the normally open contacts F4 to a junction between the switch MF and the coil F and through the normally open contacts R4 to a junction between the switch MR and the coil R.

The armature ARM and the field winding FD are connected in a conventional reversing circuit for a series motor M which includes the normally open contacts F1 and R1 and the normally closed contacts F2 and R2 as follows: one side of the field winding FD, indicated by a numeral 17, is connected through the contacts F1 to the lead 10 and through the contacts F2 to a terminal 31 of the armature ARM. The other side of the field winding FD, indicated by a numeral 19, is connected through the normally open contacts R1 to the lead 10 and through the normally closed contacts R2 and a lead 16 to the terminal 31 of the armature. The other side of the armature is connected through a terminal 29 and a primary winding TP of a transformer T, which has a core CT, to a lead 18. The terminal 29 is also connected through the normally open contacts SC1 to the lead 12. The lead 10 is connected through a resistor RE12 and a junction 20 to one side of a capacitor 5C which has its other side connected to the lead 12. The junction 20 is connected to one side of a primary winding TCP1 of a transformer CT. The other side of the primary winding TCP1 is connected through a diode D3 and the normally open contacts A4 to the lead 12. The transformer T additionally has a pair of secondary windings TS1 and TS2 wound on the core CT. The winding TS1 has one side connected through a diode D6 to a lead 18 and its other side connected through a junction 30 and a lead 44 to one side of a capacitor 1C which has its other side connected to a junction 32 in the lead 12. The secondary winding TS2 has one side connected through the junction 30 and the other side connected through a lead 46 to a junction 23. A silicon controlled rectifier 1SCR has an anode connected to the lead 18 and a cathode connected to the lead 12. A second silicon controlled rectifier 2SCR has an anode connected to the lead 18 and a cathode connected to the junction 23. The silicon controlled rectifier 2SCR has a gate electrode connected through a secondary winding TCS of the transformer TC to the junction 23. The lead 18 is connected through a resistor RE16, a junction 43, the normally open contacts A3, a resistor RE5 and a junction 26 to one side of a capacitor 6C which has its other side connected to the lead 12. Connected in a parallel circuit with the resistor RE5 is a series circuit which includes the collector to emitter electrodes of an NPN type transistor 5T and a resistor RE6. The transistor 5T has a base electrode connected through a resistor RE7 to a junction 24. The junction 26 is connected to an emitter electrode of a unijunction type transistor 4T which has a base electrode B1 connected through a resistor RE13 to the lead 12 and a base electrode B2 connected to the junction 43. A zener diode Z4 is connected between the lead 12 and the junction 43 to maintain the potential between the junction 43 and the lead 12 at a constant value. The silicon controlled rectifier 1SCR has a gate electrode connected to the base B1 electrode of the transistor 4T. The junction 24 is connected through a lead 25 to one side of a capacitor 7C which has its other side connected to the lead 12. The junction 24 additionally is connected through a resistor RE8 to the slider of a potentiometer resistor P2. The potentiometer resistor P2 has one side connected to the lead 10 and the other side connected through a junction 27 and a potentiometer resistor P3 to the lead 12. The potentiometer resistors P2 and P3 act as variable voltage dividers to vary the voltage at the junction 27. The junction 24 is also connected through the contacts H1 to a junction 22. The contacts H1, which are normally open, are closed when a coil H is energized. The coil H is connected in series with a diode D1 between the terminals 29 and 31. The diode D1 is poled to conduct current from the terminal 29 side of the armature ARM to the terminal 31 side of the armature ARM when the motor M acts like a generator during intervals of quick reversals of the flux of the field FD. Additionally, a diode D2 is connected between the terminal 29 side of the armature ARM to the lead 10 for the purposes which will be hereinafter explained. The junction 24 is also connected through the emitter and collector electrodes of a PNP type transistor 6T to the junction 27. The transistor 6T has a base electrode connected through a resistor RE9 to the lead 25 and through a resistor RE10 to a junction 33 which is connected through the normally closed contacts of the switch A2 to the lead 12. The junction 22 is connected to the junction 33 by a diode D4 which is poled to conduct current from the junction 22 to the junction 33 when the switch contacts A2 are closed. A potentiometer resistor P4 which is connected between the leads 10 and 12 has a slider connected through a diode D5 which is poled to conduct current to the junction 22 to provide a charging circuit for a capacitor 8C which has one side connected to the junction 22 and the other side connected to the lead 12.

The junction 30 is connected through a lead 28 to a junction 36. The junction 36 is connected through a zener diode Z3, a junction 34, a diode D7 and a resistor RE11 to the lead 12. The diode D7 is poled to conduct current from the lead 12 to the junction 34 and the zener diode Z3 is poled to maintain a constant voltage between the junctions 34 and 36 with junction 34 positive. The junction 34 is connected through a potentiometer resistor P1 and a junction 40 to one side of a capacitor 4C which has its other side connected to the junction 36. The potentiometer resistor P1 has a slider connected to the junction 40 for varying the rate of charging current flow to the capacitor 4C. The junction 34 is additionally connected to a base B2 electrode of a unijunction transistor 3T which has an emitter electrode connected to the junction 40. A base B1 electrode of the unijunction transistor 3T is connected through a primary winding TCP2 of the transformer TC to the side of the capacitor 4C connected to the junction 36. A resistor RE3 has one side connected to the junction 36 and its other side connected through a junction 35 and the zener diodes Z2 and Z1 to the lead 12. The zener diodes Z1 and Z2 are poled in opposite directions between the junction 35 and the lead 12. The junction 35 additionally is connected through a resistor RE2 and a capacitor 3C to the lead 12 and through the resistor RE2 to a base electrode of an NPN type transistor 2T which has an emitter electrode directly connected to the lead 12 and a collector electrode connected to a junction 37. The coil SC has one side connected to the lead 10 and the other side connected through the contacts MH of a switch to a junction 39 which in turn is connected to an anode of a silicon controlled rectifier 3SCR which has a cathode connected to the lead 12. The junction 37 is connected through a resistor RE1 to the junction 39 and through a capacitor 2C to the lead 12. Additionally, the junction 37 is connected to an emitter of a unijunction transistor 1T which has a base electrode B2 connected to the junction 39 and a base B1 electrode connected through a junction 41 and a resistor RE14 to the lead 12. The junction 41 is connected to a gate electrode of the silicon controlled rectifier 3SCR.

As shown in the drawing, dots are placed at one end of each of the primary and secondary windings of the transformers T and TC. The dots on respective transformer windings indicate the manner in which the windings are wound on the respective cores of the transformers so that at an instant in time, the ends of the windings with the dots will have the same polarity. Further, in the circuit shown in the drawing, certain filter circuits, blocking diodes, temperature stabilizing resistors, voltage regulating diodes, disconnect switches and the like have been omitted for purposes of clarity to facilitate the understanding of the circuit. The proper inclusion of the well known elements in the circuit will be readily understood by those skilled in the art.

The leads 10 and 12 are both energized by the battery B. When the mechanical brake of the truck is released, the contacts of the switch BS close and complete a circuit between the lead 14 and the battery B. The truck master and directional switch is then actuated by the truck operator. If the truck is to operate in the forward direction, the switch contacts MF are closed while the contacts MR remain open because of a mechanical interconnection therebetween. The closed contacts MF complete an energizing circuit through the normally closed contacts A1 and the SC2 and the closed contacts MF to energize the operating coil F of the forward contactor which causes the normally open contacts F1, F3 and F4 to close and the normally closed contacts F2 to open. The closure of the contacts F3 completes a holding circuit for the contactor coil F so the normally closed contacts A1 and SC2 may open without de-energizing the coil F. When the contacts F1 close and the contacts F2 open, a circuit is complete through the contacts F1, the field winding FD, the normally closed contacts R2, the lead 16, the windings of the motor armature ARM, the primary winding TP to the lead 18. Also, during standby conditions, the capacitor 5C is charged through the resistor RE12 from the lead 10 in a direction making the junction 20 side thereof positive in polarity relative to the lead 12 side.

The closure of the contacts F4 completes an energizing circuit to the coil A of the accelerating relay which in response thereto causes the normally open contacts A3 and A4 to close and the normally closed contacts A1 and A2 to open.

The opening of the contacts A1 is without significance at this point as the closed contacts F3 maintain an energizing circuit for the coils F and A of the forward contactor and the accelerating relay. The contacts A2 which are closed prior to the energization of the coil A complete a discharge circuit for the capacitor 8C through the diode D4. Also, the closed contacts A2 connect the base of the transistor 6T to the lead 12 while the emitter of the transistor 6T is connected through the potentiometer resistor P2 and the resistor RE8 to the lead 10. Thus the transistor 6T will be biased to conduction and maintain a minimum charge across the capacitor 7C which has a value as determined by the position of the slider of the potentiometer resistor P3. When the contacts A2 open in response to the energization of the coil A, the discharge circuit through the diode D4 for the capacitor 8C is interrupted and the capacitor 8C begins to charge to a value determined by the position of the slider of the potentiometer resistor P4 making the junction 22 side thereof positive in polarity relative to the lead 12. Similarly, when the contacts A2 open, the transistor 6T ceases to conduct and the capacitor 7C begins to charge through a circuit which includes the potentiometer resistor P2 and the resistor RE8, causing the junction 24 side of the capacitor 7C to become positive in polarity relative to lead 12.

When the contacts A3 close, a charging circuit is established from the junction 43 through the contacts A3 and the resistor RE5 for the capacitor 6C, making the junction 26 side of the capacitor 6C positive in polarity relative to lead 12. It is to be appreciated that the charging of the capacitors 6C, 7C and 8C is not instantaneous and will occur at a time rate determined by the value of the impedances in their respective charging circuits.

The closure of the contacts A4 completes a discharge circuit for the capacitor 5C through the junction 20, the primary winding TCP1, the diode D3 and the closed contacts A4. The current flow through the primary winding TCP1 which accompanies the discharge of the capacitor 5C causes the secondary winding TCS to supply a current pulse through the gate and cathode electrodes of the silicon controlled rectifier 2SCR which in response thereto switches to a conductive state. The conducting rectifier 2SCR passes current from the lead 18 through the junction 23, the lead 46, the secondary winding TS2, the junction 30, the lead 44 to the capacitor 1C which causes the capacitor 1C to charge in a direction making the junction 30 side thereof positive in polarity relative to the junction 32. When the capacitor 1C is fully charged, the current flow through the rectifier 2SCR ceases and the rectifier 2SCR returns to its blocking state. For purposes of explanation, the charge across the capacitor 1C which causes the junction 30 to have a positive polarity relative to the junction 32 side of the capacitor 1C will approach the potential of the battery B and will be designated as the preset charge and the capacitor 1C will be termed the commutating capacitor.

While the rectifier 2SCR is providing preset charge to capacitor 1C as described, the capacitor 6C will acquire a charge from charge current which flows from the junction 43 through the closed switch contacts A3 and the resistor RE5 at a rate determined by the impedance value of the resistor RE5 and in a direction making the junction 26 positive in polarity relative to lead 12. After a predetermined time interval, the charge on the capacitor 6C will cause the emitter to base B1 potential of the unijunction transistor 4T to exceed the product of intrinsic standoff ratio times the potential between the base B1 and B2 electrodes of the transistor 4T. When the charge on the capacitor 6C exceeds this value, the transistor 4T will switch to a conductive state and thereby cause the capacitor to discharge a pulse of current to the gate electrode of the silicon controlled rectifier 1SCR, which in response thereto switches to its conductive state. The conducting rectifier 1SCR establishes a current flow from the positive terminal of the battery B through the following circuit components: contacts F1, motor field FD, contacts R2, lead 16, armature ARM, transformer primary TP, lead 18, rectifier 1SCR and lead 12 to energize the motor field FD and the motor armature ARM so the motor operates in the forward direction.

As was previously described, the capacitor 1C was provided with a preset charge equal to the battery B potential and which made the junction 30 side thereof positive in polarity during the brief time interval when the rectifier 2SCR was switched to its conductive state. The current flow through the primary winding TP and the secondary winding TS2 which caused the preset charge is not of a magnitude which magnetically saturates the iron core CT of the transformer. For purposes of description, the flux polarity of the core CT caused by this preset charge current will be designated as the positive direction of saturation on the hysteresis loop of the core CT. When the rectifier 1SCR is switched to its conductive state to energize the field winding FD and the armature ARM, the current which flows through the primary winding TP causes the secondary winding TS1 to provide an output current which is conducted through a circuit which includes the diode D6, the conducting rectifier 1SCR, the lead 12, the junction 32, the capacitor 1C and the junction 30. The current flow through the circuit described impresses a charge on the capacitor 1C which causes the junction 32 side thereof to have a positive potential relative to junction 30 which will be designated as the commutating charge across the capacitor 1C.

The commutating charge on the capacitor 1C may be much greater magnitude than battery B potential and is dependent on the winding turns of transformer T, the rate of current change in primary winding TP in the positive direction and the point to which flux level of core CT is reset after each charging cycle. The commutating charge on the capacitor 1C is impressed across the series circuit which includes the resistor RE11, the diode D7, the junction 34 and the zener diode Z3. The zener diode Z3 acts as a voltage regulator and causes a predetermined potential to appear between the junctions 34 and 36 which potential causes the capacitor 4C to charge at a rate determined by the adjustment of the slider on the potentiometer resistor P1 in a direction which causes the junction 40 side of capacitor 4C to become positive in polarity relative to the junction 36. When the positive potential at the junction 40 exceeds the intrinsic standoff ratio times the voltage between the base B1, B2 electrodes of the unijunction transistor 3T, the transistor 3T switches to a conductive state and rapidly and completely discharges the capacitor 4C through the emitter and base B1 electrode and the primary winding TCP2. The discharge of the capacitor 4C through the primary winding TCP2 causes the secondary winding TCS to supply a current pulse to the gate of the rectifier 2SCR which in response thereto switches to its conductive state.

It should be noted at this point that switching of rectifier 2SCR to its conductive state in response to the current pulse from the secondary winding TCS is assured by the presence of the commutating potential charge accumulation on the capacitor 1C. When the rectifier 1SCR is conducting, the potential drop between the leads 18 and 12 is of the magnitude of 1 to 2 volts, which would be insufficient to cause the rectifier 2SCR to switch to a conductive state. The commutating charge accumulation on the capacitor 1C, as described, adds to the voltage drop across the rectifier 1SCR to produce a sufficient potential to cause the rectifier 2SCR to switch to a conductive state when triggered by the pulse of current from the secondary winding TCS.

When the rectifier 2SCR switches to a conducting state for the purpose of switching the rectifier 1SCR to a nonconductive state, two circuit paths are present to discharge the current energy impressed on the capacitor 1C. One path is from the junction 32 through the lead 12, the cathode to anode of rectifier 1SCR, which is in the conducting state, through the anode to cathode of the conducting rectifier 2SCR, the junction 23, the lead 46, the winding TS2 and the junction 30. The second path is from junction 32, to the battery B, through the contacts F1, the winding FD, the contacts R2, the armature ARM, the winding TP, the lead 18, the anode to cathode of the conducting rectifier 2SCR, the junction 23, the lead 46, the winding TS2, and the junction 30. As is well known, the preferred path of current flow is always along the lines of least resistance. The first path described exhibits the lower resistance of the two paths since it includes the conducting rectifier 1SCR, the conducting rectifier 2SCR, the winding TS2 and the lead inductances of the connecting leads as described. The second path includes the field winding FD which has a low ohmic resistance and a high inductive impedance which tends to prevent an increase in current flow through the second path from the capacitor 1C in a manner well known to those skilled in the art. It can be seen then that the preferred path of discharge current flow for commutating charge on the capacitor 1C is through the rectifier 1SCR in a direction opposite to the current flow through the armature ARM which is flowing through the rectifier 1SCR in response to an earlier switching signal from the transistor 4T. The commutating current flow from the capacitor 1C through the rectifier 1SCR sweeps out all the positive charge carriers in the rectifier 1SCR, thereby causing the rectifier 1SCR to switch to a nonconducting state. During the time required for the rectifier 1SCR to switch off, the "sweep out" current magnitude may rise to several times the level of the forward current flowing through the rectifier 1SCR. This current flow, through the rectifier 2SCR and the winding TS2, causes the flux of the core CT to be driven in a negative direction on the hysteresis loop for the core CT and will tend to saturate the core CT in the negative direction. In addition, the winding TS2 preferably is selected to have an inductance sufficient to limit the rate of rise of current through the rectifier 2SCR while the rectifier 2SCR is switching to its conducting state to a value so that its junction will not be damaged by an excessive rise in current. Thus winding TS2 provides a dual function, as it limits the current rise through the rectifier 2SCR and acts as a reset winding for core CT to induce the proper state of residual magnetism in the core CT prior to the next cycle of conduction of the rectifier 1SCR. The state of the residual magnetic condition of the core CT is important as it determines the amount of energy that can be stored in the capacitor 1C during the formation of the commutating charge on the capacitor 1C for the next commutation cycle of the rectifier 1SCR.

After the rectifier 1SCR switches to a nonconductive state and the rectifier 2SCR is in a conducting state, the second path becomes the preferred path to discharge the energy across the capacitor 1C which is provided by the commutating charge. The rectifier 2SCR continues to conduct and the remaining commutating charge on the capacitor 1C is dissipated through the second path, which includes the battery B, the windings of the motor M, the transformer windings TP and TS2. The current flow continues in the second path until polarity of the capacitor 1C has completely reversed and risen to approximately the potential of battery B with junction 30 positive relative to junction 32. The foregoing will cause the capacitor 1C to have a charge which is identical with the preset charge which was initiated at the start of the sequence for the first cycle and which occurs inherently at the end of each cycle of commutation. Further, when the rectifier 1SCR switches to a nonconductive state, the current flow from the battery B through the motor windings effectively ceases with the exception of the current flow which caused the preset charge to be formed on the capacitor 1C which ceases when the capacitor 1C is charged to battery B potential. During the interval when the preset charge is formed on the capacitor 1C, a part of the path for the current includes windings TP and TS2 in a series in the charging circuit. Because of the polarities of the windings TP and TS2 and the manner in which the windings TP and TS2 are connected in the series circuit, the current which flows to form the preset charge produces magnetic fluxes in the core CT which have opposite polarities. Since the winding TP is selected to have more turns on the core CT than the winding TS2, the flux effect caused by the current in the winding TP will predominate and tend to drive the net flux in the core CT in the positive direction on the hysteresis loop. However, as the net difference in the number of turns of the windings TP and TS2 is selected to be minimal, the net positive flux produced will be minimal and only a small change in the positive direction of the residual magnetic condition of the core CT will result. The residual flux condition of core CT was previously driven in a negative direction by the current flow during switch-off of rectifier 1SCR. The flux produced by preset charge current tends to make the flux more positive than it was during commutation current flow, and tends to store energy in the magnetic core CT. As the charge on the capacitor 1C approaches the potential of the battery B, the rectifier 2SCR will tend to become nonconductive. During this interval the energy stored in core CT is released and transmitted through the conducting rectifier 2SCR to charge capacitor 1C with a potential of a higher magnitude than potential of battery B, before the rectifier 2SCR switches automatically to a nonconductive state. Since rectifiers 1SCR and 2SCR are now in a nonconducting state and the capacitor 1C is now at a higher potential than battery B, current will flow through the circuit which includes the junction 30, the winding TS1, the diodes D6, the winding TP, the armature ARM, the field winding FD and the battery B to the junction 32 until charge on capacitor 1C equals potential of battery B. This equalizing current flow through windings TS1 and TP is in a direction to drive the flux in the core CT more negative than it was during reset by winding TS2. Thus the core CT will be conditioned so that a maximum commutating charge will be impressed on the capacitor 1C when the rectifier 1SCR is subsequently switched to a conductive state and the primary winding TP induces the charging current in the secondary winding TS1, as previously described.

Summarizing, it is apparent that when the contacts A4 close, the initial charge on the capacitor 5C, which existed during standby conditions, caused the rectifier 2SCR to momentarily switch without delay to a conductive state and supply a preset charge to the capacitor 1C. The contacts A3, which close simultaneously with the closure of the contacts A4, control a charging circuit for the capacitor 6C which in response to the closure of contacts A3 charges at a rate determined by the resistance in its charging circuit including the resistor RE5. The rectifier 1SCR, which is switched to a conductive state when the charge across the capacitor 6C reaches a predetermined value, causes a current flow which energizes the motor M and causes a commutating charge to be impressed on the capacitor 1C by an output current from the transformer winding TS1. Further, the output current which provided the commutating charge on the capacitor C1 also provided a charging current for the capacitor 4C. The rectifier 2SCR, which switches to a conductive state in response to a predetermined charge on the capacitor 4C, causes the commutating charge on the capacitor 1C to be delivered to the conducting rectifier 1SCR and to the transformer windings TS1, TS2 and TP in a manner to switch the rectifier 1SCR to a nonconductive state and to desaturate the core CT of the transformer.

The armature ARM and the field FD are energized by the conduction of the rectifier 1SCR. The switching to a conductive state of the rectifier 1SCR initiates a timing means which controls the switching of the rectifier 2SCR to a conductive state which in turn causes the rectifier 1SCR to switch to a nonconductive state. Thus the armature ARM and the field FD are supplied with a current pulse of a predetermined duration each time the rectifier 1SCR conducts.

The switching of the rectifier 1SCR is controlled by the charge on the capacitor 6C. The rectifiers 1SCR and 2SCR are both connected in a shunt circuit with the charging circuit for the capacitor 6C. Thus during the interval when the rectifier 1SCR is conducting, a low potential circuit is connected in parallel with the charging circuit for the capacitor 6C and the capacitor 6C does not begin to charge to re-initiate the conduction of the rectifier 1SCR until the conduction of the rectifier 1SCR ceases, and the conduction of 2SCR causes capacitor 1C to begin to acquire its preset charge.

As was previously stated, at the time of the opening of the contacts A2, a small charge was impressed on the capacitor 7C which has a magnitude determined by the position of the slider on the potentiometer resistor P3. This charge on the capacitor 7C is impressed between the base and emitter of the transistor 5T to slightly bias the transistor 5T toward conduction. The transistor 5T is connected in a parallel circuit with the resistor RE5 in the charging circuit for the capacitor 6C so the rate of change of the charge on the capacitor 6C will vary with the conduction of the transistor 5T.

Initially, as the capacitor 7C has a minimum charge impressed thereon, the transistor 5T will have a predetermined low conduction. When the contacts A2 open, the capacitor 7C begins to increase its charge through a charging circuit which includes the lead 10, the portion of the potentiometer register P2 determined by the position of its associated slider, and the resistor RE8 at a rate basically determined by the resistance value of the resistor RE8 and the potential determined by the position of the slider on the potentiometer resistor P2. As the charge across the capacitor 7C gradually increases, the conduction of the transistor 5T increases and thereby decreases the time required for the capacitor 6C to charge and initiate the conduction of the rectifier 1SCR. Thus subsequent to the energization of the coil A, the time intervals between the pulses of current which are supplied to the motor windings will gradually decrease so that the acceleration of the motor is smooth and controlled from a minimum speed determined by the initial charge across the capacitor 7C. The acceleration of the motor M ceases when the capacitor 7C is charged to a value determined by the adjustment of the slider on the potentiometer P2, which is known as the speed control adjustment means of the system. It will be seen that if the slider is positioned at the lead 12 side of the potentiometer resistor P2, the armature ARM will rotate at a low speed and if the slider is positioned adjacent to the lead 10 side of the potentiometer resistor P2, the motor operates at a high speed. Further, when the position of the slider on the potentiometer P2 is changed to cause the motor to operate at a higher speed, the change of the charge across the capacitor 7C will be gradual and thus the motor accelerates smoothly to the higher speed.

If a lower speed of operation of the motor is desired, the slider on the potentiometer resistor P2 is moved toward the lead 12. When the slider is thus repositioned, the positive potential at the junction 24 side of the capacitor 7C exceeds the positive potential at the slider of the potentiometer resistor P2 and the capacitor 7C discharges at a rate through the resistor RE8 and the portions of the potentiometers P2 and P3 between their respective sliders and the lead 12 so that the motor smoothly decelerates to the lower speed.

As previously described, during the period of conduction of the rectifier 1SCR, the capacitor 1C receives a commutating charge which causes the junction 32 to have a positive polarity relative to junction 30. Similarly, during the interval when the rectifier 1SCR is nonconductive, the capacitor 1C receives a preset charge which causes the junction 30 to have a positive polarity relative to junction 32. Also, while the periods of conduction of the rectifier 1SCR are constant, as determined by the constant charging rate of the capacitor 4C, the periods of nonconduction of the rectifier 1SCR are variable as determined by the variable charging rate of the capacitor 6C. Thus, as the speed of the motor is gradually increased, the periods during which the junction 30 has a positive polarity will gradually decrease while the periods during which the junction 32 has a positive polarity remain constant. The junction 30 side of the capacitor 1C is connected through the lead 28, the junction 36, the resistor RE3, the junction 35, the zener diodes Z2 and Z1 and lead 12 to the junction 32. The zener diode Z2 is connected to freely pass current from the junction 35 to the lead 12 and block current flow from the lead 12 to the junction 35 when the positive potential at lead 12 relative to the junction 35 is less than a predetermined value. Similarly, the zener diode Z1 is connected to freely pass current from the lead 12 to the junction 35 and block current flow from the junction 35 to the lead 12 when the positive potential at the junction 35 relative to the lead 12 is less than a predetermined value. The capacitor 3C is connected between the junction 35 and the lead 12. Thus, during the interval when the junction 30 is positive in polarity relative to the junction 32, the capacitor 3C receives a charging current in the direction to make the junction 35 side thereof positive, which charging current has a value limited by the blocking characteristics of the zener diode Z1. Similarly, during the interval when the junction 32 has a positive polarity relative to the junction 30, the capacitor 3C is provided with a charging current in the direction to make the lead 12 side of the capacitor 3C positive in polarity, which charging current is limited by the blocking characteristics of the zener diode Z2. The resistor RE3 and capacitor 3C are selected so the capacitor 3C will not be fully discharged by either of the foregoing described charging currents during a single cycle regardless of the charging direction of the currents. Thus the polarity of the charge on the capacitor 3C will be determined solely by the algebraic difference of the positive to the negative currents. When the motor is operating at a low speed, the time interval during which the junction 30 has a positive polarity relative to junction 32 will exceed the intervals during which the junction 32 is positive relative to the junction 30 and the capacitor 3C is charged in direction making the junction 35 positive in polarity relative to the lead 12. As the motor speed is gradually increased, the relative time intervals during which the junction 30 has a positive polarity relative to the junction 32 will gradually decrease while the time intervals during which the junction 32 is positive relative to the junction 30 will remain constant. Thus the positive potential at the junction 35 relative to the lead 12 will gradually decrease and will reverse, as positive polarity time intervals become shorter than negative time intervals, thus making the potential at the lead 12 positive relative to the junction 35.

The junction 35 and the lead 12 are respectively connected through the resistor RE2 to the base and the emitter of the transistor 2T. Thus when the junction 35 is positive relative to the lead 12 the transistor 2T is biased toward conduction and when the lead 12 is positive relative to the junction 35, the transistor 2T is biased against conduction. The capacitor 2C, which is connected between the emitter and collector electrodes of the transistor 2T, is connected in a charging circuit which includes the lead 10, the energizing coil of a contactor SC, normally open switch contacts MH and a resistor RE1. When the contacts MH are closed, as will be later described, the charging circuit for the capacitor 2C is completed.

While the transistor 2T is conducting, the capacitor 2C remains at a potential determined by the amount of conduction of 2T. Because the conduction of the transistor 2T is gradually decreased, by virtue of decreasing positive charge on capacitor 3C, the lead 12 side of the capacitor 3C becomes increasingly positive, and the transistor 2T will be biased against conduction which causes the charge on the capacitor 2C to gradually increase in a direction making the junction 37 side thereof positive relative to lead 12 side. When the positive potential at the junction 37 exceeds the product of the intrinsic standoff ratio times the potential between the B1 and B2 electrodes of the transistor 1T, the transistor 1T switches to a conductive state and discharges the capacitor 2C while the transistor 1T conducts a pulse of curren from the capacitor 2C to the gate and the cathode electrodes of the silicon controlled rectifier 3SCR which in response thereto switches to its conductive state.

The switch MH preferably is mechanically interconnected with the slider on the speed adjusting potentiometer resistor P2 to be closed when the slider is at the highest speed setting; that is, adjacent the lead 10 side of the potentiometer resistor P2. Thus, because of the operation of the circuits heretofore described, even if the master directional switch, which controls the position of the slider on the potentiometer resistor P2 and the switch contacts MH, should be suddenly moved from a low speed setting to a full speed setting, the acceleration of the motor is gradual and uniform until a predetermined speed occurs wherein the rectifier 3SCR switches to its conductive state. When the switch MH is closed and the rectifier 3SCR is switched to a conductive state as heretofore described, the coil winding SC of a contactor, known as the shorting contactor, is energized. The coil SC when energized will cause the normally open contacts SC1 to close and the normally closed contacts SC2 to open.

When the contacts SC1 close, the armature ARM and the field winding FD are directly connected across the battery B and the rectifiers 1SCR and 2SCR and their associated control circuits are effectively de-energized to minimize electrical losses in the system. The opening of the contacts SC2 is without effect at this time because the contacts F3 are closed. The normally open contacts SC2 and A1 are included to ensure that energization of the coils F or R cannot be accomplished until both coils SC and A are de-energized.

When the armature ARM and the field winding FD are energized so the motor rotates in the forward direction, and it is desired to either rapidly stop or rapidly reverse the direction of rotation, the master and directional switch is operated. When the master and directional switch is thus operated and the contacts MF and MH open, if the latter be closed, and if the master and directional switch is moved to a reverse operating position, the contacts MR close and the slider on the potentiometer resistor P2 passes through its lowest speed setting to a position wherein the motor M is to rotate at some preselected speed in the reverse direction. The most extreme case under which the system is required to operate is a condition wherein the motor M is rotating at a maximum forward speed when the master and directional control switch is adjusted for rotation of the motor M in the maximum reverse direction or vice versa. When the master and directional control is thus repositioned, the switch contacts MH open, de-energizing the coil winding SC of the shorting contactor which causes the contacts SC1 to open and the contacts SC2 to close as well as to interrupt the anode circuit for the rectifier 3SCR so the rectifier 3SCR switches to a nonconductive state. When the contacts MF open and the contacts MR close, the relay coil A is de-energized and the contacts A1 are required to be closed before the contactor coil R is energized. Normally, the contacts A1 and A2 open and the contacts A3 and A4 close before the contacts F1, F3 and F4 open and the contacts F2 close, when the switch MF is opened. However, even if the contacts of the relay A and the forward contactor F should open simultaneously, or the accelerating relay should operate subsequent to the forward contactor, the contactor coil R will not be energized until the contacts A1 are closed. Thus both the relay coil A and the contactor coil F must be de-energized before the contactor coil R can be energized. The contactor coil R is energized through a circuit which includes the switch BS, the lead 14, the closed contacts A1 and SC2, the switch MR and the contactor coil R. The contacts R1, R3 and R4 close and the contacts R2 open when the contactor coil R is energized. When the contacts R1 close and the contacts R2 open, a circuit is completed through the contacts R1, the field winding FD, the normally closed contacts F2, the windings of the motor armature ARM so that the motor M is energized in a manner causing it to operate in the reverse direction of rotation.

When the current flow through the field winding FD is thus reversed while the armature ARM is rotating in the forward direction, the counter voltage of the armature ARM also reverses in polarity and tends to increase the effective system voltage by acting as an additional voltage source in series circuit with the battery B and also establishes conditions for a high plugging current to circulate through the armature ARM and field winding FD through the diode D2. The high currents generated by the armature ARM under these conditions are controlled by the diode D1 and the relay coil H which are connected in a shunt circuit with the armature ARM. The diode D1 maintains the reverse voltage on the armature ARM at a low level while the relay coil H, which is responsive to the current flow through the diode D1, closes its contacts H1. When the current in the relay coil H decreases to a predetermined low value, as the rotation of the armature ARM in the forward direction decreases to a low value prior to reversal in response to the direction of the energization of the field winding FD, the contacts H1 open.

During the interval of transition between the de-energization of the coil F and the energization of the coil R, the contacts A2 are closed, and any charge on the capacitor 8C is rapidly and effectively dissipated through the circuit which includes the diode D4. The relay coil A, which is energized subsequent to the energization of the contactor coil R, causes the contacts A2 to open and interrupt the discharge circuit for the capacitor 8C. When the contacts A2 open, the capacitor 8C begins to charge to a potential having a value determined by the slider on the potentiometer resistor P4, making the junction 22 increasingly positive in polarity relative to lead 12 but at a lower positive rate of charge than capacitor 7C.

When field FD has been reversed and the current through diode D1 is flowing in response to the generator action of the motor M, contacts H1 close and connect the capacitors 7C and 8C in parallel which causes the capacitor 7C to discharge to the lower potential as determined by the setting of P4. Junction 24 is also held at this potential by contacts H1 so the conduction level of 5T is reduced to less than it would be for a normal start from a position of rest. A reduced conduction of 5T causes the intervals of time between periods of conduction of 1SCR to be increased and thereby reduces the field FD excitation during the time of generator action of the motor M. This reduces the severity of the plugging action during the decelerating period. The adjustment of potentiometer P4 controls the severity of the deceleration. When motor M has decelerated to nearly zero speed, the current through diode D1 and coil H decreases to a value which causes the contacts H1 to open and disconnect the capacitor 8C from base circuit of transistor 5T. The capacitor 7C now begins to charge to a potential determined by the setting of potentiometer P2 through a circuit which includes the potentiometer resistor P2 and the resistor RE8. The gradual increase of the potential on the capacitor 7C causes the conduction of the transistor 5T to gradually increase so that controlled acceleration of motor M in the reverse direction is accomplished in the same manner as has been previously described for forward direction.

Preferably the capacitor 8C is selected to have several times the capacitance of the capacitor 7C and is normally at a lower positive potential by the adjustment of the slider on the potentiometer resistor P4. When the contacts H1 are closed, the capacitors 7C and 8C are connected in a parallel circuit and an alternate charging path through RE8 and that portion of the potentiometer resistor P2 between the slider and the lead 10 is available to charge the capacitors 7C and 8C. Should a condition exist, which requires a regenerative braking action which is greater than the normal amount which results from minimum field excitation, contacts H1 would remain closed and the capacitors 7C and 8C will charge through resistor RE8 to thereby simulate the increases in motor speed which would be accomplished by changing slider position of potentiometer resistor P2. The charging path through RE8 allows 7C and 8C to acquire a charge progressively but at a lower rate than normal and dependent on the slider position of potentiometer P2, so that the plugging severity may be varied by manually positioning the slider on the potentiometer resistor P2 which is the speed control means for the system.

It is apparent that the potentiometer resistor P4 is used to control the energization of the motor field FD during plugging of the motor M. As the slider of the potentiometer resistor P4 is moved toward the lead 10, the field strength increases and more rapid deceleration of the motor M results. The potentiometer resistor P2 basically serves as the speed control means for the motor M and the potentiometer P3 is used to adjust the minimum charge on the capacitor 7C for normal slow speed operation in one direction and therefore the minimum excitation of the armature ARM and field winding FD.

As was previously indicated, the motor armature ARM and field FD are supplied with a single current pulse whenever the rectifier 1SCR conducts. Thus the effective current through the armature ARM and field FD is dependent upon the duration of the rectifier 1SCR conduction, and the freqeuncy of its conduction. During the periods when the rectifiers 1SCR and 2SCR are non-conductive, no current is supplied by the battery B to the motor M. During this interval, the inductive energy which has been stored in the armature and field windings by a previous pulse of current through the conducting rectifier 1SCR causes a current flow through the diode D2 so that in effect a continuous current flows through the motor M. This continuous current has a value exceeding the current supplied by the battery B. This result occurs because the system operates effectively and efficiently to transfer the high voltage-low current pulses from battery B into a low voltage-high current through the armature ARM and field windings FD of the motor.

When the armature ARM and field winding FD were initially energized to cause the motor M to rotate from standstill, the contacts H1 are open and the capacitor 7C has a minimum charge impressed thereon as determined by the position of the slider on the potentiometer resistor P3. This minimum charge on the capacitor 7C causes the transistor 5T to be slightly biased to conduction to decrease the resistance in the charging circuit for the capacitor 6C, and the time interval required for the necessary potential to be impressed across the capacitor 6C to switch the rectifier 1SCR to a conductive state. Thus the position of the slider on potentiometer P3 determines the minimum speed of the motor M when the motor M begins to rotate. Further, it is apparent that if the motor M is energized for rotation in either the forward or reverse direction and it is desired to stop the rotation of the motor M without plugging, all that is required is to move the master directional control switch to a neutral position wherein the switch contacts MH and MF are open and the slider is positioned at the lead 12 end of the potentiometer resistor P2. Assuming the foregoing adjustment of the master directional control switch is made, the forward contactor coil F and the accelerating relay coil A are de-energized and the contacts F1, F3, F4, A3 and A4 open and contacts F2, A1 and A2 closed without energizing the reverse contactor coil R, then the charge on the capacitor 7C is rapidly dissipated by the transistor 6T which is biased to conduction by the charge on the capacitor 7C when the contacts A2 close. The capacitor 7C discharges to a value determined by the position of the slider on the potentiometer resistor P3. The purpose of the foregoing discharge path provided by the transistor 6T is to discharge the capacitor each time the master directional switch is moved to the neutral position. It will be seen that the capacitor 7C could also discharge through a path which includes the resistor RE8 and the potentiometer resistor P2. However, the resistance of the resistor RE8 is relatively high and is included to limit the charging current to the capacitor 7C and the acceleration of the motor M to the speed determined by the position of the slider on the potentiometer P2. The rapid discharge of the capacitor 7C prevents an undesirable acceleration of the motor M under the following condition. Assume the master directional control is moved from a position which required a high motor M speed to a neutral position and the load on the motor M caused the motor M speed to rapidly decrease, then if the master directional control is rapidly moved to its former position before the charge on the capacitor 7C is dissipated, the motor M will suddenly accelerate, and if the motor M is used to drive a vehicle, a sudden increase in the vehicle will result.

While certain preferred embodiments of the invention have been specifically disclosed, it is understood that the invention is not limited thereto, as many variations will be readily apparent to those skilled in the art and the invention is to be given its broadest possible interpretation within the terms of the following calims.

What is claimed is:

1. A control system for a reversible direct current motor having a field winding and an armature winding comprising: a direct current source providing a pair of output terminals, a commutating capacitor, a first and a second controlled rectifying electronic switch each having an anode, a cathode and a control electrode, a transformer having a first and a second winding on a common core, circuit means connecting the anodes of the first and second switches in series with the first transformer winding, the armature winding and the field winding to one of the terminals of the source, circuit means connecting the cathode of the first switch to a first side of the capacitor and to the other of the said pair of terminals of the source, circuit means connecting the cathode of the second switch to a second side of the capacitor for impressing a preset charge on the capacitor when the second switch is in a conductive state and for switching the second switch to a nonconductive state when the preset charge has a predetermined value, circuit means connecting the second transformer winding in a series circuit with the capacitor and the anode and cathode of the first switch for impressing a commutating charge on the capacitor when the first switch is conducting current through the first transformer winding, circuit means responsive to the commutating charge on the capacitor and connected between the gate and cathode of the second switch for initiating conduction of the second switch a predetermined time interval after the commutating charge on the capacitor reaches a predetermined value for impressing the commutating charge on the capacitor across the cathode to anode of the first switch for switching the first switch to a nonconductive state and for impressing a reset charge on the capacitor and switching the second switch to a nonconductive state when the reset charge on the capacitor has a predetermined value, a timing means for supplying a signal between the gate and cathode of the first switch for initiating conduction of the first switch after the second switch is switched to a non-conductive state, and means for initially switching the second switch to a conductive state for forming the preset charge on the capacitor before the timing means causes the first switch to be switched to a conductive state.

2. The combination as recited in claim 1 wherein the first and the second windings are connected in said circuits with the capacitor to desaturate the core when the second switch is switched from a conductive to a nonconductive state and to saturate the core when the first switch is conducting current including means for switching the second switch to a conductive state for forming the preset charge on the capacitor for driving the magnetic flux in the core in the desaturating direction before the timing means causes the first switch to be switched to a conductive state to drive the core in a saturated direction.

3. A control system for a direct current motor having an armature winding and a field winding comprising: a source of direct current, a first and a second silicon controlled rectifier each having an anode, a cathode and a gate electrode for switching the rectifier from a nonconducting to a conducting state in response to a signal between its associated gate and cathode and from a conducting to a nonconducting state in response to a signal of predetermined magnitude and polarity between its associated cathode and anode, a first circuit means connecting the anode and cathode of the first rectifier in series with the armature and field windings and the source for passing current in a predetermined direction through the armature and field windings, a second circuit means connecting the anode and cathode of the second rectifier in series with the armature and field windings and the source, a first timing means connected in a parallel circuit with the anode and cathode of the second rectifier and in a circuit with the gate and cathode of the first rectifier for switching the first rectifier to a conductive state an adjustable time after the second rectifier is switched to a nonconductive state, a second timing means connected in a circuit with the gate and cathode of the second rectifier for switching the second rectifier to a conductive state a predetermined time interval after the first rectifier is switched to a conductive state, a capacitor connected in circuit with the anode and cathode of the first and second rectifiers for switching the second rectifier to a nonconductive state in response to a predetermined magnitude and polarity reset charge which is impressed on the capacitor when the second rectifier is in a conductive state for a predetermined time interval and for switching the first rectifier to a nonconductive state in response to a commutating charge which is impressed on the capacitor to have a predetermined magnitude and a polarity opposite the polarity of the reset charge when the first rectifier is in a conductive state and the second rectifier is subsequently switched to its conductive state, said second timing means being energized by the commutating charge on the capacitor whereby the first rectifier is switched to a conductive state for an interval of predetermined time duration as determined by the second timing means to supply a current pulse to the armature and field windings from the source which current pulses are separated by adjustable time intervals as determined by the first timing means, means for progressively decreasing the time interval required from a predetermined adjustable minimum value for the first timing means to supply a signal for switching the first rectifier to a conductive state, a differentiating means responsive to the magnitude and polarity of the commutating and reset charges which are impressed across the capacitor for supplying an output signal when the duration of the commutating charge relative to the reset charge exceeds a predetermined maximum value, and circuit means responsive to the output signal from the differentiating means for connecting the armature winding and the field winding directly across the source and for supplying a shorting circuit between the anode and cathodes of the first and the second rectifiers.

4. The combination as recited in claim 3 including means responsive to the magnitude and direction of current flow through the armature winding for decreasing the predetermined minimum time interval when the direction of current flow through the field winding is reversed.

5. A control system for a reversible direct current motor having an armature winding and a field winding comprising: a direct current source, a silicon controlled rectifier connected in a series circuit with the armature winding, the field winding and the source for passing current through the armature winding and the field winding from the source when the rectifier is in a conductive state, an adjustable directional control means in the series circuit for interrupting the series circuit and for controlling the direction of current flow through the field winding for causing the armature to rotate in either of two directions, an adjustable timing means including a timing capacitor and a time rate circuit for charging the capacitor for providing a signal at timed intervals to the rectifier for causing the rectifier to switch from a nonconductive state to a conductive state, means for switching the rectifier from a conductive state to a nonconductive state a fixed time interval after the rectifier has been switched to a conductive state whereby the rectifier is switched to a conductive state to provide pulses of constant time duration current to the armature winding and the field winding at a frequency determined by the timed intervals of the signal from the timing means, means progressively changing the charging rate of the capacitor for progressively increasing the frequency of the pulses from a first predetermined value to a second adjustable value when the armature winding and field winding are initially energized for rotation in one direction for causing the armature rotation to smoothly accelerate from a predetermined minimum speed to a speed of rotation determined by the second adjustable value, means providing an input to the timing means for decreasing the charging rate of the capacitor and thereby the frequency of the pulses to a value less than the first predetermined value when the two position control is adjusted to cause the armature to rotate in said one direction and the armature winding and the field windings are energized for rotation in a direction opposite the said one direction.

6. The combination as recited in claim 5 wherein the capacitor is discharged each time the directional control means is adjusted to interrupt the series circuit.

7. The combination as recited in claim 5 wherein the means which provides an input to the timing means for decreasing the frequency of the pulses to a value less than the first predetermined value includes a second capacitor and an electromagnetic switch having an energizing coil in a parallel circuit with the armature winding and a pair of normally open switch contacts connecting the second capacitor to the timing capacitor.

8. The combination as recited in claim 7 which includes a means for discharging the second and the timing capacitors each time the directional control means is adjusted to interrupt the series circuit.

9. The combination as recited in claim 5 wherein the means which switches the rectifier to a conductive state includes a commutating capacitor which is charged through a circuit which includes the rectifier and a second silicon controlled rectifier which when switched to a conductive state causes the charge on the commutating capacitor to be impressed in a reverse direction across the rectifier.

No references cited.

ORIS L. RADER, *Primary Examiner.*

G. SIMMONS, *Assistant Examiner.*